*P. Eggleston,*
*Circular Saw Mill.*
Nº 16,725.                    Patented Mar. 3, 1857.
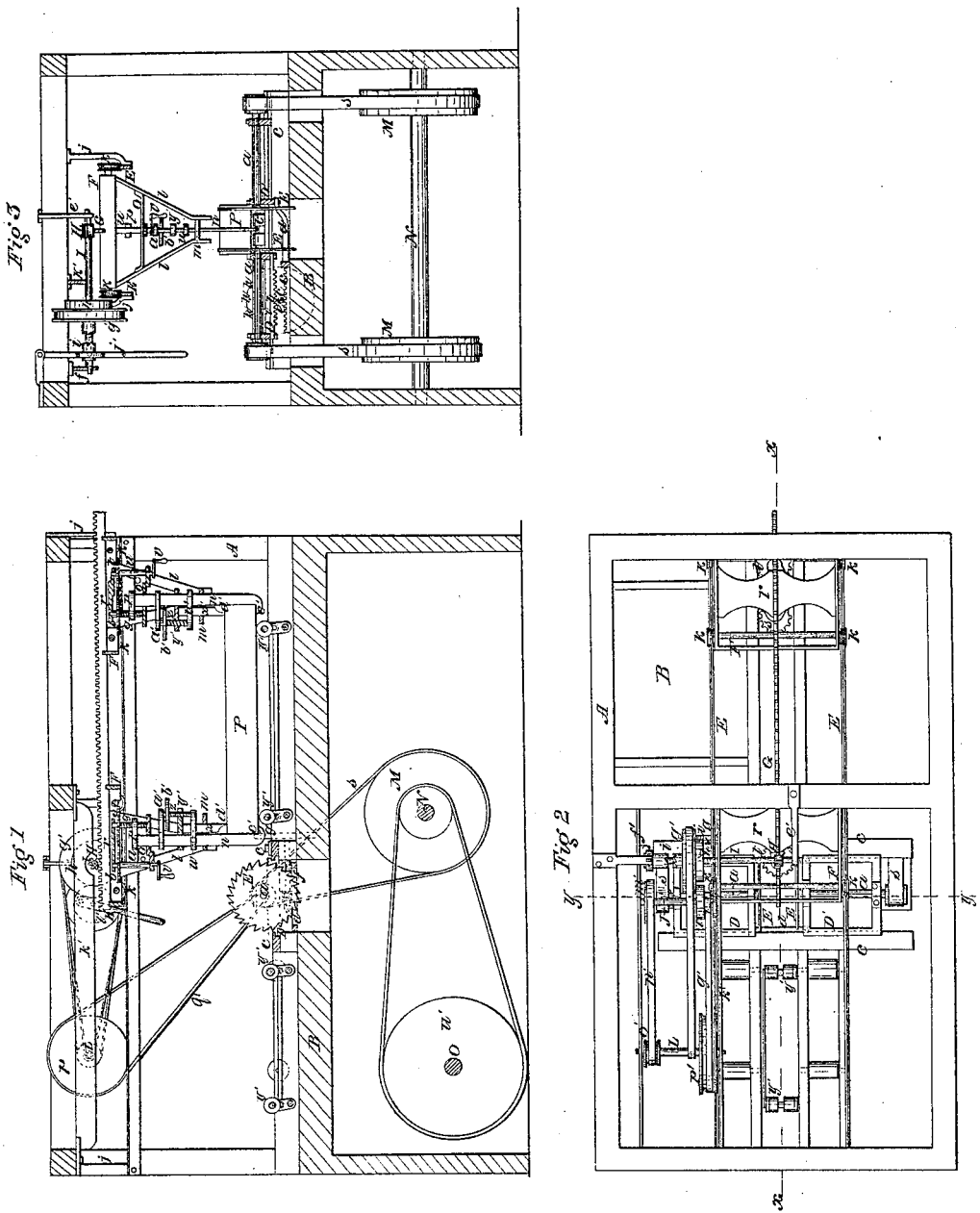

UNITED STATES PATENT OFFICE.

PHILANDER EGGLESTON, OF MOBILE, ALABAMA.

CIRCULAR-SAWING MILL.

Specification of Letters Patent No. 16,725, dated March 3, 1857.

*To all whom it may concern:*

Be it known that I, PHILANDER EGGLESTON, of Mobile, in the county of Mobile and State of Alabama, have invented certain new and useful Improvements in Circular-Saw Mills; and I do hereby declare that the following is a full, clear, and exact description of the same, reference being had to the annexed drawings, making a part of this specification, in which—

Figure 1, is a longitudinal vertical section of my improvement, (*x*) (*x*) Fig. 2, showing the plane of section. Fig. 2, is a plan or top view of ditto. Fig. 3, is a transverse vertical section, of ditto, (*y*) (*y*) Fig. 1, showing the plane of section.

Similar letters of reference indicate corresponding parts in the several figures.

The invention consists in suspending the log to the carriage, or, attaching it to the under side of the carriage by means of hooks and dogs arranged as will be hereinafter fully shown and described, and also the two saws and feed movement when used in connection with the log suspended to the carriages.

To enable those skilled in the art to make and use my invention, I will proceed to describe its construction and operation.

A represents a rectangular framing constructed in any proper manner to support the working parts.

B represents a flooring or bed, on which the ways C, C, are placed, and D, D', are the frames fitted between the ways C, C, the frames being allowed to slide freely between the ways. On each frame D, an arbor or shaft (*a*) is placed and fitted in suitable bearings, and a circular saw E, is secured on the inner end of each arbor or shaft. In the frame D, a rack (*b*) is secured as shown clearly in Fig. 3, and a rack (*c*) is connected to the frame D', by a frame (*d*) which is allowed to slide underneath the frame D, the rack (*c*) being below the rack (*b*) and in the same plane. Between the two racks (*b*) (*c*) a pinion (*e*) is fitted, the pinion gearing into both racks. This pinion is hung upon a shaft (*f*) which passes transversely through one of the ways and has a circular disk (*g*) attached to its end, said disk having holes (*h*) made in it near its periphery to receive a pin or stop (*i*). See Figs. 2 and 3.

E, E, represent two ways which are attached to pendants *j*, at the ends of the framing A. The ways E, E, are placed longitudinally with the framing A, and transversely with the saw arbors or shafts (*a*) (*a*). On the ways E, E, two carriages F, F, are placed, said carriages being provided with grooved rollers (*k*) at each side, the rollers fitting on the ways E, E. On the carriages F, F, a rack G is placed, the rack being parallel with the ways E, E. The rack G at one end is permanently attached to one of the carriages F, but the opposite end of the rack merely rests upon the other carriage in grooves made in its end pieces. To the under surface of each carriage F, two oblique pendants (*l*) (*l*) are attached, the lower ends of the pendants of each carriage being connected to slotted plate (*m*) through which a vertical bar (*n*) passes. The bars (*n*) also pass up through plates (*o*) at the upper ends of the pendants and have small horizontal bars (*p*) attached through which screw rods or shafts (*q*) pass (see Fig. 1) the lower ends of said shafts being stepped in the plates (*o*), and the upper ends working in transverse plates (*r*) in the carriages F, F. On the upper ends of the screw rods or shafts (*q*) toothed wheels (*s*) are placed, one on each, and these toothed wheels gear into corresponding wheels (*t*) (*t*) which are placed on the upper end of shafts (*u*) and fitted between the same plates (*o*) (*r*). The lower ends of the shafts (*u*) have cranks (*v*) attached. To each bar (*u*) a small horizontal bar (*w*) is attached and a vertical bar (*x'*) is fitted and allowed to slide in each bar (*w*), the upper ends of the bars (*x'*) have horizontal bars (*y'*) attached through which the bars (*n*) pass. Through the bars (*y'*) screw rods (*z*) pass, the lower ends of which are stepped in the bars (*w*) the upper ends being fitted in bars (*a'*) attached permanently to the bars (*u*). A hand-wheel (*b'*) is attached to the upper end of each screw rod (*z*). The lower ends of the bars (*u*) have hooks (*c'*) formed on them, and the lower ends of the bars (*x'*) are pivoted as shown at (*d'*) Fig. 1. The points (*d'*) serving as dogs to secure the log in proper position as will be presently shown.

H represents a pinion which gears into the rack G. This pinion is placed on the inner end of a shaft I, the inner end of said shaft working in a pendent bar (*e'*) attached to the framing and the opposite end working in a horizontal bar (*f'*) secured in the framing. On the shaft I two pulleys (g') (h') are placed loosely, said pulleys being connected with the shaft when desired by a clutch (i), operated by a lever (j) as shown clearly in Fig. 3.

J is a shaft, one end of which is fitted or has its bearing in the bar (f'), and the opposite end fitted in a lever K which is pivoted to a bar (k') which is parallel with the bar (f'). See Figs. 1 and 2. On the shaft J, two pulleys (l') (m') are placed, and a belt (n') passes around the pulley (m') and also around a pulley (o'), on a shaft L placed between the two bars (f') (k'). A pulley (p') is placed upon the shaft L, around which pulley a belt (q') passed from the arbor or shaft of one of the saws. A belt (r') also passes around the pulley (q') on the shaft J, and around the shaft L. The two saw arbors (a) (a) are driven by belts (s') (s') from pulleys M, underneath the flooring, said pulleys being placed on a shaft N, which is driven by a bolt (t') from a pulley (n') on the driving shaft O.

D represents the log to be sawed the ends of which are secured between the hooks (c) at the lower ends of the bars (n), and the points (d') at the lower ends of the bars (x'), the log is firmly secured or dogged between these hooks and points by turning the screw rods (z) in the proper direction, the bars (x') being thereby forced down, the points (d¹) as they penetrate the log, also forcing the hooks (c') into its under side. The log may be adjusted or raised and lowered bodily by turning the screw rods or shafts (u), said rods or shafts when turned in the proper direction, raising both the bars (n) and (x'). The log P rests upon rollers (y') on the flooring B.

The saws E, E, are set to the log by turning the disk (g) and both saws are moved simultaneously in opposite directions or toward and from each other in consequence of the pinion (e) gearing into both racks (b) (c), the saws therefore are set at both sides of the log at the same time. The log P is fed to the saw and gigged back by the pinion H gearing into the rack G. When the pulleys (g') (h') are attached or connected to the shaft I, the log will be fed to the saws, but when said pulleys are disconnected from the shaft I, and the lever K moved so as to press the pulley (l') against the pulley (h'), on the shaft I, a reverse motion is given the pinion H, and the log will be gigged back. A board or plank is sawed from each side of the log, at the same time and the machine requires the attendance of but one person.

The ordinary sawing machines that are provided with one saw require three attendants, one to gig back the carriage, and two to set the log to the saw, the latter attendants are required to be constantly at their posts, consequently where two saws are employed, arranged in the usual way, six attendants are required. By having the carriage placed at the upper part of the framing and the log suspended therefrom, a free or unobstructed space is allowed on the flooring so that all parts of the machine are rendered very accessible to the attendant.

As one of the carriages F is not attached to the rack G, said carriage may be set farther backward or forward, so that logs of varying lengths may be secured or dogged between the lower ends of the bars (n) (x'), of the two carriages.

I do not claim separately the means employed for feeding the log to the saws and gigging back the log, for that is a well known device and in common use; but,

Having thus described my invention, what I claim as new, and desire to secure by Letters Patent, is,

1. Suspending the log P to the carriages E, E, by means of the bars (n) and (x') arranged substantially as shown with the screw rods (z) (q) and shafts (u) whereby the log may be firmly dogged or secured in proper position and also adjusted, or elevated or depressed to the desired position or height.

2. I claim suspending the log P, from the carriages F, F, as shown in any proper manner, in combination with the two saws E, E, arranged as shown, and the feed movement composed of the shafts I, J, L, with their respective pulleys and belts and the clutch operating as described.

PHILANDER EGGLESTON.

Witnesses:
CLEVELAND A. MOULTON,
G. Y. OVERALL.